July 8, 1958 H. A. JAMES 2,842,628
DRIVER DOZER ALARM
Filed June 10, 1957 2 Sheets-Sheet 1
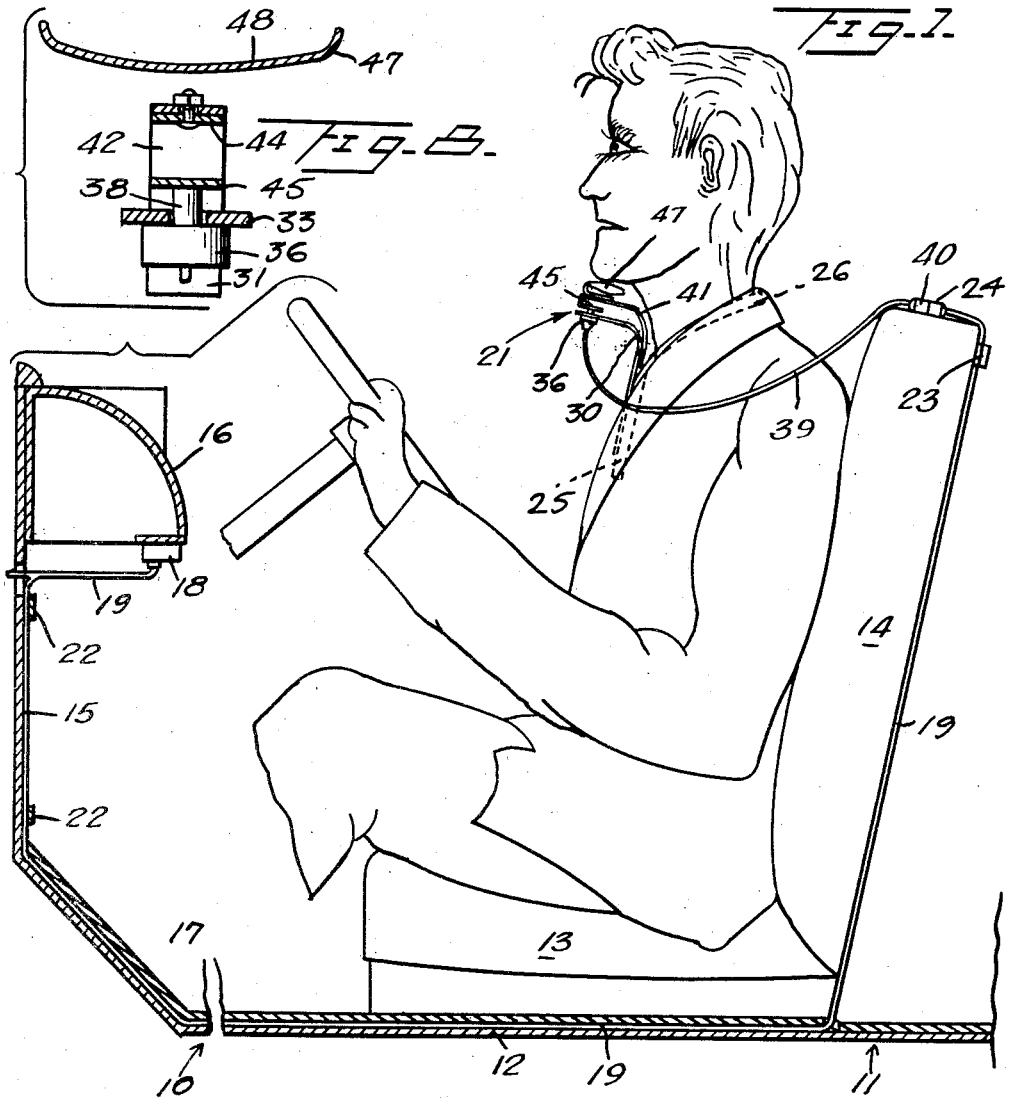
INVENTOR
H. A. JAMES
BY Kimmel & Crowell
ATTORNEYS

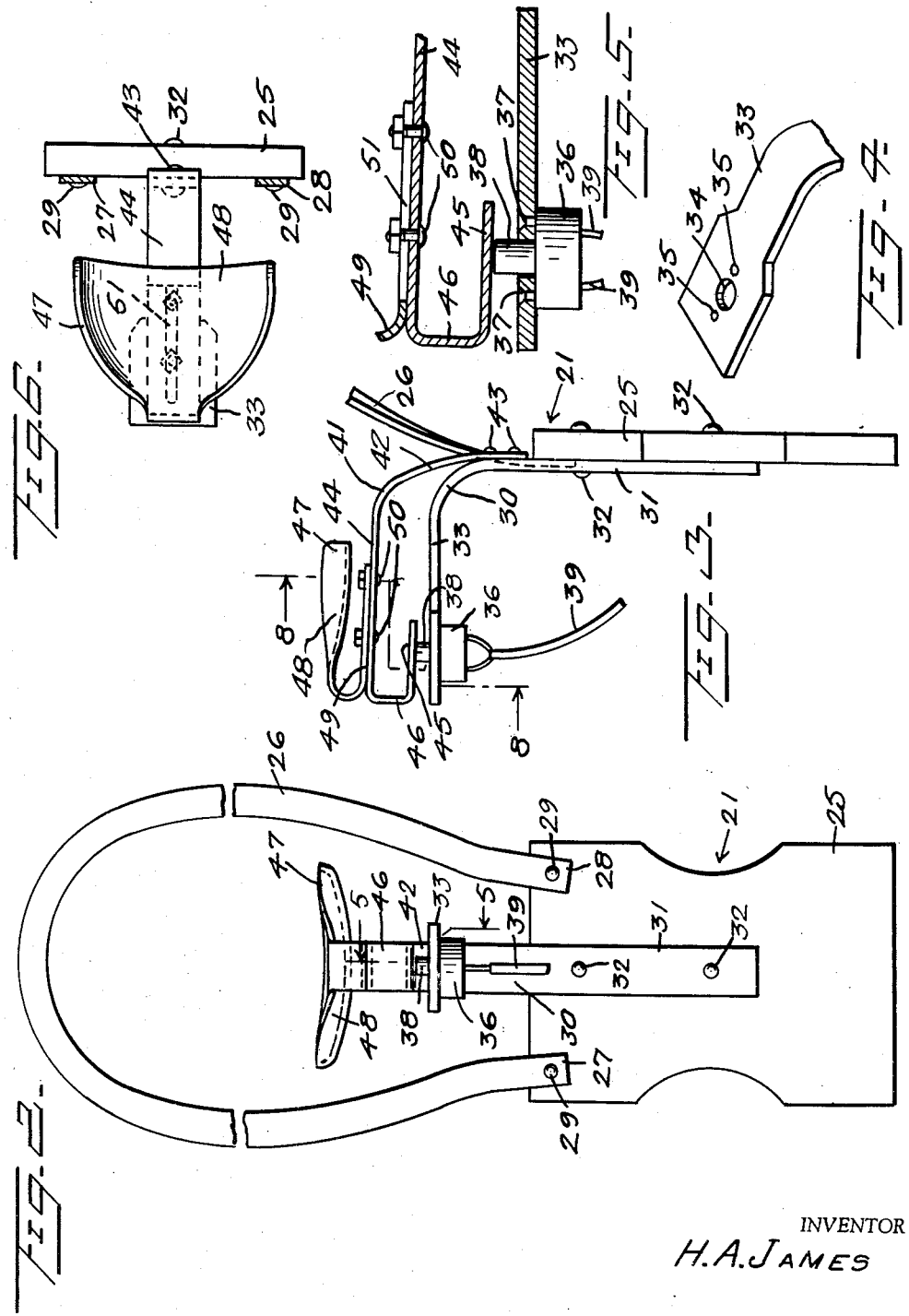

United States Patent Office 2,842,628
Patented July 8, 1958

2,842,628
DRIVER DOZER ALARM
Horace A. James, Riverton, N. J.

Application June 10, 1957, Serial No. 664,807

4 Claims. (Cl. 200—52)

The present invention relates to driver dozer alarms, and more particularly to alarms of this type operated by the nodding head of the dozing driver.

The primary object of the invention is to provide an alarm for awakening a dozing driver quickly enough to permit the driver to retain control of the vehicle.

Another object of the invention is to provide a dozer alarm of the class described above in which the alarm sounder is permanently attached to the vehicle and the actuator is detachably connected thereto.

A still further object of the invention is to provide an alarm of the class described above in which the alarm is partially supported about the neck of the driver in position to underlie the chain thereof.

A still further object of the invention is to provide a driver dozer alarm of the class described above which is inexpensive to manufacture, simple to install and use, and which is completely effective in awakening a dozing driver.

Other objects and advantages will become apparent in the following specification when considered in the light of the attached drawings, in which:

Figure 1 is a perspective view of the invention shown in position within a motor vehicle with parts broken away and in section for convenience of illustration.

Figure 2 is a fragmentary front elevation of the alarm actuator.

Figure 3 is a fragmentary side elevation of the invention.

Figure 4 is a fragmentary perspective view of one of the elements of the invention.

Figure 5 is a fragmentary enlarged vertical cross-section taken on the line 5—5 of Figure 2, looking in the direction of the arrows.

Figure 6 is a horizontal cross-section taken along the line 6—6 of Figure 2, looking in the direction of the arrows.

Figure 7 is a wiring diagram illustrating the circuits involved in the invention.

Figure 8 is an enlarged fragmentary horizontal cross-section taken on the line 8—8 of Figure 3, looking in the direction of the arrows.

Referring now to the drawings in detail wherein like reference characters indicate like parts throughout the several figures, the reference numeral 10 indicates generally a driver dozer alarm constructed in accordance with the invention.

The driver dozer alarm 10 is adapted for installation in a motor vehicle, a portion of which is indicated generally at 11. The motor vehicle 11 has a floor 12, a seat 13, a seat back 14, a fire wall 15, a dashboard 16, and a floor mat 17, all of conventional construction and used in the conventional manner.

The driver dozer alarm 10 includes an electrical buzzer 18 secured beneath the dashboard 16 by any suitable means (not shown) and has extending therefrom wires 19 connected to a battery 20 and to an alarm actuator assembly indicated generally at 21. The wires 19 are secured to the fire wall 15 by means of clips 22 and extend between the floor 12 and the floor mat 17 to a position rearwardly of the seat 13.

The wires 19 then extend upwardly against the rear of the seat back 14 to which they are secured by means of a clip 23. The wires 19 terminate at the upper edge of the seat back 14 in a detachable connector terminal 24 of conventional construction.

The alarm actuator assembly 21 includes a breast plate 25 formed relatively flat and provided with a loop strap 26 having its opposite ends 27 and 28, respectively, detachably connected to the breast plate 25 by means of detachable connector elements 29 of conventional construction.

An L-shaped arm 30 has one leg 31 thereof secured to the face of the breast plate 25 by means of securing elements 32. A second leg 33 extends perpendicularly to the leg 31 in a substantially horizontal plane.

The second leg 33 has a large bore 34 formed vertically therein adjacent the outer end thereof and a pair of smaller bores 35 arranged on opposite sides of the bore 34.

An electric switch 36 is secured to the underside of the leg 33 by bolts 37 extending through bores 35 and has the operating button 38 thereof extending upwardly through the bore 34 formed in the leg 33. Wires 39 extend from the switch 36 to a detachable connector element 40 which is adapted to cooperate with the connector element 24 to electrically connect the wires 19 to the wires 39.

A generally L-shaped spring arm 41 is provided with an upright leg 42 secured to the upper end of the leg 31 by means of securing elements 43. The spring arm 41 has an integral horizontal leg 44 extending generally parallel to the leg 33 of the arm 30.

A switch 36 actuating member 45 is arranged in spaced parallel relation beneath the leg 44 and is connected thereto by an integral link 46.

A chin saddle 47 is provided with a dished upper portion 48 having an integral support 49 positioned thereneath in generally parallel relation and secured to the arm 44 by securing elements 50 passing through an adjustment slot 51 in the support 49.

In the use and operation of the invention, the breast plate 25 is engaged against the chest of the driver and held there by the neck band 26 extending about the driver's neck. The chin saddle 47 is positioned beneath the chin of the driver so that upon movement of the driver's head such as will occur in nodding on dozing, the chin will engage the chin saddle 47, moving the arcuate spring arm 44 on the arm 30 so that the switch actuator member 45 will engage the button 38 and close the contacts of the switch 36 completing the circuit to actuate the buzzer 18. Obviously, a loud buzzing noise from the buzzer 18 will cause the driver to awaken quickly so as to retain control of the vehicle.

The alarm 10 may have the separable connector members 24, 40 thereof separated so that the alarm actuator assembly 21 may be disconnected from the driver and stored until its use is again necessary.

Having thus described the preferred embodiment of the invention, it should be understood that numerous structural modifications and adaptations may be resorted to without departing from the scope of the appended claims.

What is claimed is:

1. A dozing driver alarm comprising an alarm buzzer, an alarm actuator assembly and means connecting said alarm actuator assembly and said buzzer to a source of electric energy with said assembly comprising a breast plate, a neck strap having the opposite ends thereof detachably connected to said breast plate, an L-shaped member having one leg thereof secured to said breast plate, an electric contact switch supported on the other leg of said L-shaped member, an L-shaped spring arm secured to said L-shaped member, a chin engaging member secured to said spring arm, and means depending from said spring arm for closing the contacts of said electrical contact switch.

2. A device as claimed in claim 1 wherein said chin engaging member is adjustably carried on said spring arm.

3. A device as claimed in claim 1 wherein said electrical contact member is secured to said other leg of said L-shaped member adjacent the free end thereof and has an operating button projecting therethrough.

4. A device as claimed in claim 1 wherein said electric contact switch is detachably coupled to said buzzer and said source of electric energy.

References Cited in the file of this patent
UNITED STATES PATENTS 2,747,038     Perkovich _____ May 22, 1956